US010318983B2

(12) United States Patent
Wu et al.

(10) Patent No.: US 10,318,983 B2
(45) Date of Patent: Jun. 11, 2019

(54) EXPANSION OF TARGETING CRITERIA BASED ON ADVERTISEMENT PERFORMANCE

(71) Applicant: Facebook, Inc., Menlo Park, CA (US)

(72) Inventors: Gang Wu, Sunnyvale, CA (US); Haibin Cheng, San Jose, CA (US); Xiao Zhang, Mountain View, CA (US); Boris Pierre Arnoux, San Mateo, CA (US); Anh Phuong Bui, Foster City, CA (US)

(73) Assignee: Facebook, Inc., Menlo Park, CA (US)

( * ) Notice: Subject to any disclaimer, the term of this patent is extended or adjusted under 35 U.S.C. 154(b) by 634 days.

(21) Appl. No.: 14/335,796

(22) Filed: Jul. 18, 2014

(65) Prior Publication Data
US 2016/0019581 A1 Jan. 21, 2016

(51) Int. Cl.
*G06Q 30/02* (2012.01)
(52) U.S. Cl.
CPC ..... *G06Q 30/0244* (2013.01); *G06Q 30/0269* (2013.01)
(58) Field of Classification Search
CPC .................................. G06Q 30/0207–30/0277
See application file for complete search history.

(56) References Cited

U.S. PATENT DOCUMENTS

| | | | | |
|---|---|---|---|---|
| 6,651,242 B1* | 11/2003 | Hebbagodi | ........... | G06F 9/4881 714/2 |
| 7,805,407 B1* | 9/2010 | Verbeke | ............ | G06F 17/30575 707/634 |
| 9,299,091 B1* | 3/2016 | Sugnet | .................. | G06Q 30/02 |
| 2005/0125289 A1* | 6/2005 | Beyda | .................... | G06O 30/02 705/14.53 |
| 2005/0131762 A1* | 6/2005 | Bharat | .................. | G06Q 10/00 705/14.66 |
| 2006/0224447 A1* | 10/2006 | Koningstein | .......... | G06Q 30/02 705/14.13 |
| 2007/0233626 A1* | 10/2007 | Rupp | .................... | G06Q 10/10 706/20 |
| 2011/0047072 A1* | 2/2011 | Ciurea | .................. | G06Q 20/10 705/39 |

(Continued)

OTHER PUBLICATIONS

Improving Personalization Solutions Through Optimal Segmentation of Customer Bases, Jiang et al., IEEE Transactions on Knowledge and Data Engineering, vol. 21, No. 3, Mar. 2009.*

(Continued)

*Primary Examiner* — David J Stoltenberg
(74) *Attorney, Agent, or Firm* — Fenwick & West LLP

(57) ABSTRACT

An online system selects advertisements for presentation a user based on characteristics of the user. The online system monitors performance of advertisements based on a goal for the advertisement and a time interval for achieving the goal. During a time period within the time interval, the online system determines an actual performance of the advertisement and compares the actual performance to a portion of the goal associated with the time period. If the actual performance does not satisfy the portion of the goal associated with the time period, the online system expands targeting criteria of the advertisement to increase a number of users eligible to be presented with the advertisement.

16 Claims, 8 Drawing Sheets

(56) References Cited

U.S. PATENT DOCUMENTS

| | | | |
|---|---|---|---|
| 2012/0166285 A1* | 6/2012 | Shapiro | G06Q 30/0251 705/14.58 |
| 2012/0166532 A1* | 6/2012 | Juan | G06Q 50/01 709/204 |
| 2012/0245887 A1* | 9/2012 | Spears | G06Q 30/02 702/179 |
| 2012/0246174 A1* | 9/2012 | Spears | G06Q 30/02 707/749 |
| 2012/0246718 A1* | 9/2012 | Spears | G06Q 30/02 726/21 |
| 2013/0013682 A1 | 1/2013 | Juan et al. | |
| 2013/0124298 A1* | 5/2013 | Li | G06O 30/0241 705/14.42 |
| 2013/0132194 A1* | 5/2013 | Rajaram | G06Q 30/0251 705/14.52 |
| 2013/0138514 A1* | 5/2013 | Yan | G06O 30/0241 705/14.71 |
| 2013/0151334 A1* | 6/2013 | Berkhin | G06Q 30/0275 705/14.52 |
| 2013/0159100 A1* | 6/2013 | Raina | G06Q 30/0241 705/14.52 |
| 2013/0218678 A1* | 8/2013 | Benyamin | G06Q 30/0255 705/14.53 |
| 2013/0290249 A1* | 10/2013 | Merriman | G06F 17/30578 707/610 |
| 2014/0122245 A1* | 5/2014 | Qu | G06Q 30/0269 705/14.66 |
| 2014/0156360 A1 | 6/2014 | Shalita et al. | |
| 2014/0156566 A1 | 6/2014 | Kabiljo et al. | |
| 2014/0156744 A1 | 6/2014 | Hua et al. | |
| 2014/0207578 A1* | 7/2014 | Doughty | G06Q 30/0269 705/14.64 |
| 2014/0279757 A1* | 9/2014 | Shimanovsky | G06Q 30/0282 706/12 |
| 2014/0280549 A1* | 9/2014 | Rajan | H04L 67/22 709/204 |
| 2015/0006280 A1 | 1/2015 | Ruiz et al. | |
| 2015/0019311 A1* | 1/2015 | Lee | G06Q 30/0214 705/14.16 |
| 2015/0127464 A1* | 5/2015 | Benyamin | G06Q 30/0269 705/14.66 |
| 2015/0150033 A1* | 5/2015 | Law | H04N 21/44204 725/14 |
| 2015/0161670 A1* | 6/2015 | Shen | G06Q 30/0269 705/14.66 |
| 2015/0170221 A1* | 6/2015 | Shah | G06Q 30/0275 705/14.71 |
| 2015/0263925 A1* | 9/2015 | Shivashankar | H04L 67/306 706/12 |
| 2015/0317383 A1* | 11/2015 | Alkov | G06N 99/005 707/738 |
| 2016/0283574 A1* | 9/2016 | Anderson | G06F 17/30286 |

OTHER PUBLICATIONS

A Dynamic Segmentation Approach for Targeting and Customizing Direct Marketing Campaigns, Reutterer et al., Journal of Interactive Marketing vol. 20 / No. 3-4 /Summer / Autumn 2006.*

U.S. Appl. No. 14/335,792, filed Jul. 18, 2014, Inventors: Gang Wu et al.

* cited by examiner

EXPANSION OF TARGETING CRITERIA BASED ON ADVERTISEMENT PERFORMANCE

BACKGROUND

This disclosure relates generally to targeted advertising and more particularly to targeted advertising in personalized digital media.

Traditionally, advertisers have attempted to tailor advertisements based on expected demographics of users. Even before the advent of broadcast media, a business advertising a product sought to purchase advertising space for that product in a publication read by typical consumers of the product. As publishing and broadcasting costs fell, more media catered to niche audiences, allowing advertisers to more finely tune advertisements to narrower groups of media consumers. Nonetheless, advertisements mainly cater to the typical consumer of media in which the advertisements are presented, causing atypical consumers of media to encounter irrelevant advertisements. With the advent of personalized digital media, advertisements may be matched to an individual user according to known traits of the user. Producers of personalized digital media often have limited information about a user, so a producer may miss an opportunity for presenting a user with an advertisement relevant to the user because the producer lacks explicit user information indicating that the user is in the advertisement's target audience.

SUMMARY

An online system, such as a social networking system, allows its users to more easily communicate information with each other, including sharing of content from sources external to the online system through the online system. Additionally, the online system maintains a user profile for each of its users, with a user profile including information describing characteristics of a corresponding user. A user of an online system establishes connections with other users and objects maintained by the online system to identify relationships between the user and other users or objects. Based on connections between the user and objects and between the user and other users, as well as actions of the user identified by the online system, the online system may infer characteristics of the user. Using characteristics associated with the user, the online system may identify advertisements more likely to be relevant to the user for presentation to the user.

To present an advertisement to a user of the online system, the online system identifies an opportunity to present an advertisement to the user. For example, the online system receives a request to present an advertisement to the user. In various embodiments, the advertisement is presented to the user through an interface of the online system presented via a client device or through an interface provided by a third-party system affiliated with the online system. Based on the received request, the online system selects one or more advertisements for presentation to the user. To select advertisements, the online system compares characteristics associated with the user to targeting criteria associated with various advertisements and selects advertisements associated with at least a threshold number of targeting criteria satisfied by characteristics of the user. Targeting criteria associated with an advertisement identify characteristics of users to be presented with the advertisement, allowing the advertisement to be presented to a target audience of users having characteristics matching at least a threshold number of the targeting criteria. Hence, associating targeting criteria with an advertisement allows an advertiser associated with the advertisement to specify specific characteristics of a target audience of users for the advertisement.

The online system may expand the target audience for an advertisement to include users with characteristics that do not fully match the targeting criteria associated with the advertisement but that have at least a threshold measure of affinity for the advertisement. This increases the number of users to which the advertisement may be presented while accounting for a likelihood of users interacting with or having an interest in the advertisement. In one embodiment, an advertisement is associated with a goal and a time interval for achieving the goal. The goal specifies an objective for the advertisement's performance according to a measurable indicator, such as an indication of the advertisement's distribution to users, a number of distinct users presented with the advertisement, or an amount spent by an advertiser for presenting the advertisement to users. To determine whether to expand the target audience for the advertisement, the online system monitors performance of the advertisement during a time period within the time interval for the advertisement to complete the goal. For example, the online system determines a portion of the goal to be completed in the time period within the time interval. If the online system determines that the actual performance of the advertisement during the time period is less than the portion of the goal to be completed in the time period (or less than a threshold amount below the portion of the goal to be completed in the time period), the social networking system expands the target audience of the advertisement by including users that do not satisfy the targeting criteria but that have at least a threshold measure of affinity for the advertisement in the target audience.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Overview

Figure 1:
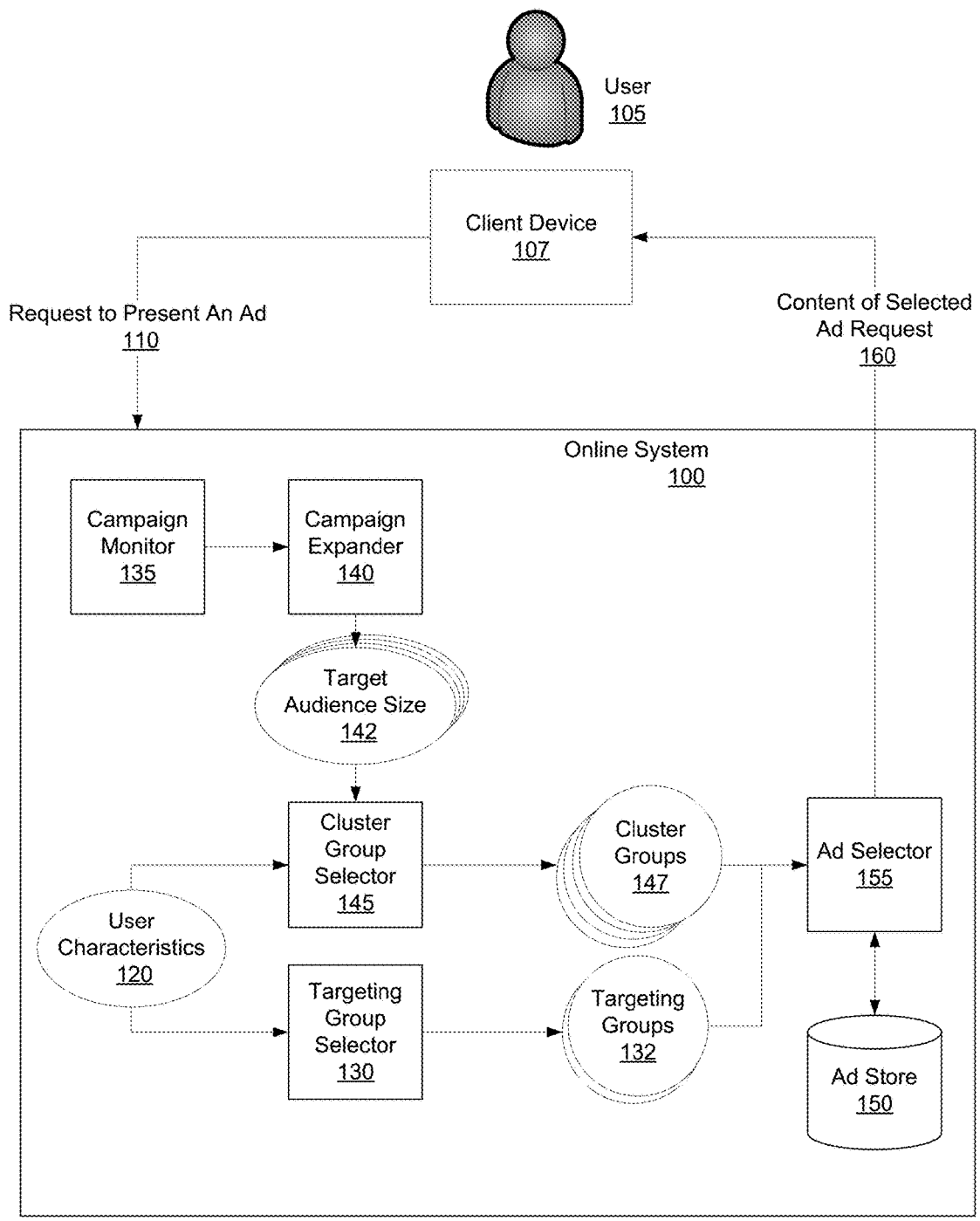
FIG. 1 is a process flow diagram illustrating advertisement selection using one or more cluster groups associated with the user, in accordance with an embodiment.

FIG. 1 is a process flow diagram illustrating advertisement selection using one or more cluster groups associated with a user, in accordance with an embodiment. A user 105 interacts with an online system 100. For example, the user 105 interacts with the online system 100 through an interface such as a webpage, an application native to an operating system on a client device 107 (e.g., a mobile phone), a third-party webpage, or a third-party application. As the user 105 interacts with the online system 100 via the client device 107, the online system 100 receives a request 110 to present an advertisement to the user 105 from the client device 107 or otherwise identifies an opportunity to present an advertisement to the user 105 via the client device 107. For example, the interface identifies one or more opportunities to present advertisements to the user 105, and causes the client device 107 to communicate the request 110 to present the advertisement to the online system 100. The advertisement may be presented by the interface in conjunction with content from the online system 100 (e.g., interspersed with content from the online system 100 or presented along with content from the online system 100). In some embodiments, the advertisement may be content provided by the online system 100.

After receiving the request 110 to present an ad to the user 105, the online system 100 selects one or more advertisements for presentation to the user 105. In one embodiment, the online system 100 retrieves characteristics 120 associated with the user 105 (also referred to herein as "user characteristics" or user characteristics 120"). User characteristics 120 are attributes or aspects of a user in the context of the online system 100 and include information in a user profile associated with the user 105 by the online system 100, connections of the user 105 to other users or objects of the online system 100, actions performed by the user 105 and recorded by the online system 100, information associated with the user and inferred by the online system 100, or any other suitable information. For example, the user 105 is associated with user characteristics indicating the user is a male resident of Minnesota with interests in hockey, potlucks, and lutefisk.

Based on the user characteristics 120 associated with the user 105, the targeting group selector 130 selects one or more targeting groups 132 associated with the user 105. A targeting group 132 includes one or more users having at least a threshold number of characteristics matching or satisfying targeting criteria associated with the targeting group. Generally, determination of whether a user is included in a targeting group 132 is based on comparing characteristics of the user to targeting criteria associated with the targeting group 132, without referring to characteristics of other users. For the example male resident of Minnesota identified above, the targeting group selector 130 identifies the user as included in targeting groups 132 associated with targeting criteria such as "males who like hockey" and "people who live in the Midwest and like lutefisk." The targeting group selector 130 is further described below with respect to FIG. 3.

Based on the user characteristics associated with the user 105, the cluster group selector 145 selects one or more cluster groups 147 associated with the user 105. In one embodiment, the cluster group selector 145 determines that the user 105 is included in a cluster group 147 based on a cluster model that determines a cluster score between characteristics of the user and targeting criteria associated with the cluster model. For the preceding example male resident of Minnesota, the user characteristics 120 of being interested in potlucks and living in Minnesota are predictive of an interest in buffets, so the cluster group selector 145 determines that the example user is a member of a cluster group 147 associated with targeting criteria specifying interest in buffets. As another example, the example male Minnesotan is unaffiliated with a fan page for the Minnesota Wild, but the cluster group selector 145 determines that the user characteristics 120 are associated with additional online system users having characteristics satisfying targeting criteria of "males who are connected to a fan page of the Minnesota Wild," so the cluster group selector 145 associates the user with a cluster group 147 associated with the targeting criteria "males who are connected to a fan page of the Minnesota Wild." The cluster group selector 145, is further described in conjunction with FIG. 3.

In one embodiment, the cluster group selector 145 computes cluster scores of the user 105 for multiple cluster groups 147 and determines cluster cutoff scores associated with each of the multiple cluster groups 147. A cluster cutoff score for a cluster group 147 specifies a minimum measure of affinity of a user for content of an advertisement request including targeting criteria associated with the cluster group 147. The cluster group selector 145 associates the user 105 with cluster groups 147 for which the cluster score of the user 105 for a cluster group 147 equals or exceeds a cluster cutoff score (or cutoff measure of affinity) for the cluster group 147. Alternatively, the cluster group selector 145 retrieves targeting criteria associated with an advertisement request from the ad store 150 and determines whether the user 105 is associated with a cluster group 147 that is associated with the targeting criteria associated with the advertisement request. Because a cluster group 147 includes users who are associated with the targeting group 132 associated with targeting criteria associated with the cluster group 147 but who are eligible to be presented with content from advertisement requests including targeting criteria associated with the cluster group 147, the cluster group 147 increases the number of users to which content from an advertisement request is eligible for presentation. Hence, a target audience for content in an advertisement request may include users associated with a targeting group 132 associated with targeting criteria included in the advertisement request and users associated with a cluster group 147 associated with the targeting criteria included in the advertisement request.

A campaign monitor 135 included in the online system 100 determines whether to identify cluster groups 147 including the user based on performance of an advertisement request 150 when the request 110 to present an advertisement is received. In one embodiment, the campaign monitor 135 captures information describing performance of an advertisement request and determines whether the user 105 is associated with a cluster group 147 associated with targeting criteria in the advertisement request if the performance of the advertisement request is less than a performance specified by a goal of the advertisement request. Hence, the campaign monitor 135 expands a target audience for the advertisement request to include users associated with a cluster group 147 associated with targeting criteria in the advertisement request as well as users associated with a targeting group 132 associated with the targeting criteria in the advertisement request if the determined performance of the advertisement request is below a performance of the advertisement request specified in the advertisement request as a goal. In one embodiment, a campaign expander 140 determines a target audience size 142 for the advertisement request if the campaign monitor 135 determines to expand the target audience for the advertisement request. Additionally, the campaign expander 140 may also determine one or more parameters associated with the target audience size (e.g., a cutoff measure of affinity, a cluster cutoff score, a target percentile of users). The campaign monitor 135 and the campaign expander 140 are further described in conjunction with FIG. 3.

Based on targeting criteria associated with the targeting groups 132 and with the cluster groups 147, an ad selector 155 included in the online system 100 retrieves ad requests from the ad store 150. The ad store 150 includes advertisement requests from advertisers. An advertisement request ("ad request") includes advertisement content (e.g., text, an image, a video, an animation), a bid amount, and may also include targeting criteria and other parameters (e.g., a performance goal, a time interval of the ad request, a time of day to present the ad). An ad request that does not include targeting criteria is eligible for presentation to any online system user, regardless of cluster groups 147 and/or targeting groups 132 associated with the user. However, an ad request including targeting criteria is eligible for presentation to online system users associated with a targeting group 132 or a cluster group 147 that is associated with the targeting criteria and is not eligible for presentation to online system users that are not associated with a targeting group 132 or a cluster group 147 that is associated with the targeting criteria. From the retrieved ad requests, the ad selector 155 selects an ad request for presentation to the user based at least in part on bid amounts associated with the retrieved ad requests. The content of a selected ad request 165 is communicated from the online system 100 to the client device 107 for presentation to the user 105. The ad store 150 and the ad selector 155 are further described below in conjunction with FIG. 3.

Referring to the previous example resident of Minnesota, the ad selector 155 retrieves ad requests including targeting criteria of "hockey" and "potluck," as this user is associated with targeting groups 132 associated with these targeting criteria, and also retrieves ad requests related to buffets and Minnesota Wild apparel based on the targeting criteria associated with cluster groups 147 associated with the user as discussed above. The ad selector 155 selects one or more of the retrieved ad requests and presents content 160 from the selected ad request to the example user.

System Architecture

Figure 2:
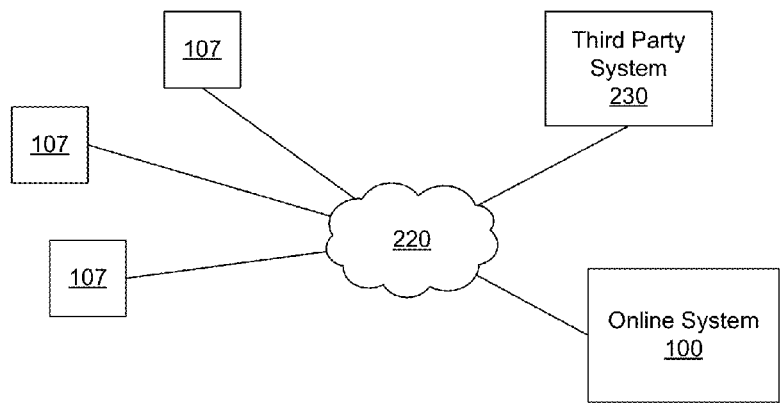
FIG. 2 is a block diagram of a system environment in which an online system operates, in accordance with an embodiment.

FIG. 2 is a high level block diagram of a system environment 200 for an online system 100, such as a social networking system. The system environment 200 shown by FIG. 2 comprises one or more client devices 107, a network 220, one or more third-party systems 230, and the online system 100. In alternative configurations, different and/or additional components may be included in the system environment 200.

The client devices 107 are one or more computing devices capable of receiving user input as well as transmitting and/or receiving data via the network 220. In one embodiment, a client device 107 is a conventional computer system, such as a desktop or laptop computer. Alternatively, a client device 107 may be a device having computer functionality, such as a personal digital assistant (PDA), a mobile telephone, a smartphone or another suitable device. A client device 107 is configured to communicate via the network 220. In one embodiment, a client device 107 executes an application allowing a user of the client device 107 to interact with the online system 100. For example, a client device 110 executes a browser application to enable interaction between the client device 107 and the online system 100 via the network 220. In another embodiment, a client device 107 interacts with the online system 100 through an application programming interface (API) running on a native operating system of the client device 107, such as IOS® or ANDROID™.

The client devices 107 are configured to communicate via the network 220, which may comprise any combination of local area and/or wide area networks, using both wired and/or wireless communication systems. In one embodiment, the network 220 uses standard communications technologies and/or protocols. For example, the network 220 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 220 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 220 may be represented using any suitable format, such as hypertext markup language (HTML) or extensible markup language (XML). In some embodiments, all or some of the communication links of the network 220 may be encrypted using any suitable technique or techniques.

One or more third party systems 230 may be coupled to the network 220 for communicating with the online system 100, which is further described below in conjunction with FIG. 3. In one embodiment, a third party system 230 is an application provider communicating information describing applications for execution by a client device 107 or communicating data to client devices 107 for use by an application executing on the client device. In other embodiments, a third party system 230 provides content or other information for presentation via a client device 107. A third party system 230 may also communicate information to the online system 100, such as advertisements, content, or information about an application provided by the third party website 230.

Figure 3:
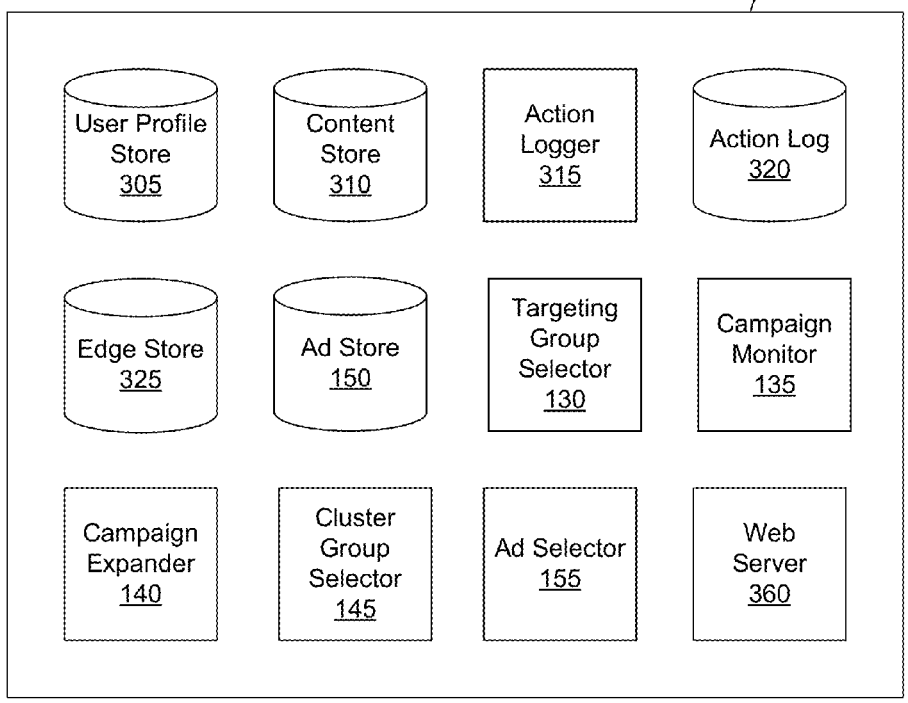
FIG. 3 is a block diagram of an online system, in accordance with an embodiment.

FIG. 3 is an example block diagram of an architecture of the online system 100. The online system 100 shown in FIG. 3 includes a user profile store 305, a content store 310, an action logger 315, an action log 320, an edge store 325, a targeting group selector 130, a campaign monitor 135, a campaign expander 140, a cluster group selector 145, an ad selector 155, an ad store 150, and a web server 360. In other embodiments, the online system 100 may include additional, fewer, or different components for various applications. Conventional components such as network interfaces, security functions, load balancers, failover servers, management and network operations consoles, and the like are not shown so as to not obscure the details of the system architecture.

Each user of the online system 100 is associated with a user profile, which is stored in the user profile store 205. A user profile includes declarative information about the user that was explicitly shared by the user and may also include profile information inferred by the online system 100. In one embodiment, a user profile includes multiple data fields, each describing one or more attributes of the corresponding online system user. Examples of information stored in a user profile include biographic, demographic, and other types of descriptive information, such as work experience, educational history, gender, age, relationship status, hobbies or preferences, location, country, languages spoken, and the like. A user profile may also store other information provided by the user, for example, images or videos. In certain embodiments, images or videos of users may be tagged with information identifying the online system users displayed in an image. A user profile in the user profile store 305 may also maintain references to actions by the corresponding user performed on content items in the content store 310 and stored in the action log 320.

While user profiles in the user profile store 305 are frequently associated with individuals, allowing individuals to interact with each other via the online system 100, user profiles may also be stored for entities such as businesses or organizations. This allows an entity to establish a presence on the online system 100 for connecting and exchanging content with other online system users. The entity may post information about itself, about its products or provide other information to users of the online system 100 using a brand page associated with the entity's user profile. Other users of the online system 100 may connect to the brand page to receive information posted to the brand page or to receive information from the brand page. A user profile associated with the brand page may include information about the entity itself, providing users with background or informational data about the entity.

The content store 310 stores objects that represent various types of content. Examples of content represented by an object include a page post, a status update, a photograph, a video, a link, a shared content item, a gaming application achievement, a check-in event at a local business, a brand page, or any other type of content. Online system users may create objects stored by the content store 310, such as status updates, images or videos tagged by users to be associated with other objects in the online system 100, events, groups or applications. In some embodiments, objects are received from third-party applications or third-party applications separate from the online system 100. In one embodiment, objects in the content store 310 represent single pieces of content or content "items." Hence, online system users are encouraged to communicate with each other by posting text and content items of various types of media to the online system 100 through various communication channels. This increases the amount of interaction of users with each other and increases the frequency with which users interact within the online system 100.

The action logger 315 receives communications about user actions internal to and/or external to the online system 100, populating the action log 320 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 320.

The action log 320 may be used by the online system 100 to track user actions on the online system 100, as well as actions on third party systems 230 that communicate information to the online system 100. Users may interact with various objects on the online system 100, and information describing these interactions is stored in the action log 310. Examples of interactions with objects include: commenting on posts, sharing links, and checking-in to physical locations via a mobile device, accessing content items, and any other suitable interactions. Additional examples of interactions with objects on the online system 100 that are included in the action log 320 include: commenting on a photo album, communicating with a user, establishing a connection with an object, joining an event, joining a group, creating an event, authorizing an application, using an application, expressing a preference for an object ("liking" the object) and engaging in a transaction. Additionally, the action log 320 may record a user's interactions with advertisements on the online system 100 as well as with other applications operating on the online system 100. In some embodiments, data from the action log 320 is used to infer user characteristics of a user (e.g., interests or preferences), augmenting the user characteristics included in the user's user profile and allowing a more complete understanding of user attributes and interests.

The action log 320 may also store user actions taken on a third party system 230, such as an external website, and communicated to the online system 100. For example, an e-commerce website may recognize a user of an online system 100 through a social plug-in enabling the e-commerce website to identify the user of the online system 100. Because users of the online system 100 are uniquely identifiable, e-commerce websites, such as in the preceding example, may communicate information about a user's actions outside of the online system 100 to the online system 100 for association with the user. Hence, the action log 320 may record information about actions users perform on a third party system 230, including webpage viewing histories, advertisements that were engaged, purchases made, and other patterns from shopping and buying.

In one embodiment, the edge store 325 stores information describing connections between users and other objects on the online system 100 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 100, such as expressing interest in a page on the online system 100, sharing a link with other users of the online system 100, and commenting on posts made by other users of the online system 100.

In one embodiment, an edge may include various features each representing characteristics of interactions between users, interactions between users and object, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the online system 100, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 325 also stores information about edges, such as affinity scores for objects, interests, and other users. Affinity scores, or "affinities," may be computed by the online system 100 over time to approximate a user's interest for an object, a topic, or another user in the online system 100 based on the actions performed by the user. A user's affinity may be computed by the online system 100 over time to approximate a user's affinity for an object, interest, and other users in the online system 100 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 325, in one embodiment. Alternatively, each interaction between a user and a specific object is stored as a separate edge. In some embodiments, connections between users may be stored in the user profile store 305, or the user profile store 305 may access the edge store 325 to determine connections between users.

One or more advertisement requests ("ad requests") are included in the ad store 150. An advertisement request includes advertisement content and a bid amount. The advertisement content is text, image, audio, video, or any other suitable data presented to a user. In various embodiments, the advertisement content also includes a landing page specifying a network address to which a user is directed when the advertisement is accessed. The bid amount is associated with an advertisement by an advertiser and is used to determine an expected value, such as monetary compensation, provided by an advertiser to the online system 100 if the advertisement is presented to a user, if the advertisement receives a user interaction, or if another suitable condition is fulfilled. For example, the bid amount specifies a monetary amount that the online system 100 receives from the advertiser if the advertisement is displayed and the expected value is determined by multiplying the bid amount by a probability of the advertisement being accessed.

Additionally, an advertisement request may include one or more targeting criteria specified by the advertiser. Targeting criteria included in an advertisement request specify one or more characteristics of users eligible to be presented with advertisement content in the advertisement request. For example, targeting criteria are used to identify users having user profile information, edges, or actions satisfying at least one of the targeting criteria. Hence, targeting criteria allow an advertiser to identify users having specific characteristics, simplifying subsequent distribution of content to different users.

In one embodiment, targeting criteria may specify actions or types of connections between a user and another user or object of the online system 100. Targeting criteria may also specify interactions between a user and objects performed external to the online system 100, such as on a third party system 230. For example, targeting criteria identify users that have taken a particular action, such as sending a message to another user, using an application, joining a group, leaving a group, joining an event, generating an event description, purchasing or reviewing a product or service using an online marketplace, requesting information from a third-party system 230, or any other suitable action. Including actions in the targeting criteria allows advertisers to further refine users eligible to be presented with content from an advertisement request. As another example, targeting criteria identify users having a connection to another user or object or having a particular type of connection to another user or object.

The targeting group selector 130 identifies targeting groups associated with a user for which an opportunity to present an advertisement has been identified, such as a user identified in a request to present an advertisement. Users associated with a targeting group are users having at least a threshold number or percentage of characteristics satisfying targeting criteria associated with the targeting group. The targeting group selector 130 may retrieve user characteristics from one or more of the user profile store 305, the action log 320, and the edge store 325. To identify targeting groups associated with a user, the targeting group selector 130 compares characteristics of the user to targeting criteria associated with various targeting groups and identifies targeting groups associated with at least a threshold number of targeting criteria satisfied by the characteristics of the user. The targeting group selector 130 may store identifiers associated with various targeting groups and user identifiers associated with each targeting group specifying users associated with each targeting group. Alternatively, the targeting group selector 130 includes an identifier of one or more targeting groups associated with a user in a user profile associated with the user and included in the user profile store 305. Alternatively, the targeting group selector 130 retrieves an ad request from the ad store 150 and determines whether characteristics of the user satisfy targeting criteria associated with the ad request.

The campaign monitor 135 determines whether to increase a number of users eligible to be presented with an advertisement request by identifying users that do not satisfy targeting criteria of the advertisement request but that have at least a cutoff measure of affinity for content in the advertisement request as eligible to be presented with the advertisement request. This identification of additional users as eligible to be presented with content from the advertisement request expands the targeting criteria of the advertisement request to identify a greater number of users. In one embodiment, an advertisement request includes a goal specifying one or more objectives of the advertisement request using a measurable indicator or metric of the advertisement request's performance (e.g., number of impressions, number of distinct users presented with content from the advertisement request, a budget for presenting the advertisement request). The advertisement request also includes a time interval for attaining the goal. The campaign monitor 135 tracks the actual performance of the advertisement request against the goal for the advertisement request. If the actual performance of the advertisement request indicates that the goal will not be met by the end of the time interval, the campaign monitor 135 causes the targeting criteria in the advertisement request to be expanded, increasing the target audience for the advertisement request. In one embodiment, the campaign monitor 135 determines a threshold below an expected performance of the advertisement request satisfying the goal of the advertisement request and expands the targeting criteria associated with the advertisement request if the actual performance is below the threshold. The campaign monitor 135 is further described below in conjunction with FIGS. 4-6.

The campaign expander 140 determines one or more parameters for expanding the targeting criteria of an advertisement request, increasing the number of users eligible to be presented with content from the advertisement request. In one embodiment, the campaign expander 140 determines one or more parameters for expanding targeting criteria of an advertisement request in response to the campaign monitor 135 determining the actual performance of the advertisement request is below a pace to satisfy the goal of the advertisement request within the time interval. For example, if the campaign monitor 135 determines that a number of conversions of the advertisement request during a portion of the time interval is less than an expected number of conversions to satisfy a goal for a number of conversions specified by the advertisement request, the campaign expander 140 expands the targeting criteria included in the advertisement request. Based on an advertisement performance metric describing user interaction with the advertisement request, the campaign expander 140 determines a target percentile of users (or a target audience size) to include in an expanded target audience for the advertisement request. Alternatively or additionally, the campaign expander 140 accounts for affinities between users and content in the advertisement request when determining a target percentile (or target audience size) for an expanded target audience of users eligible to be presented with the advertisement request. The campaign expander 140 is further described below in conjunction with FIGS. 6-8.

The cluster group selector 145 identifies one or more cluster groups associated with a user. A user associated with a cluster group is a user having at least a threshold affinity for content associated with targeting criteria associated with the cluster group. In one embodiment, the cluster group selector 145 retrieves user characteristics from one or more of the user profile store 305, the action log 320, and the edge store 325. If a user does not have characteristics satisfying targeting criteria associated with a targeting group, the user may be associated with a cluster group associated with the targeting criteria based on additional characteristics associated with the user. In one embodiment, the cluster group selector 145 associates a cluster group that is associated with targeting criteria with a user if a cluster group score representing a measure of the user's affinity for content associated with the targeting criteria has at least a threshold value. This threshold value is based at least in part on a target percentile, a target audience size, or any other suitable parameter determined by the campaign expander 140. The cluster group selector 145 may store identifiers associated with various cluster groups and user identifiers associated with each cluster group specifying users associated with each cluster group. Alternatively or additionally, the cluster group selector 145 includes an identifier of one or more cluster groups associated with a user in a user profile associated with the user and included in the user profile store 305. In another embodiment, the cluster group selector 145 retrieves an ad request from the ad store 150 and determines whether the user is associated with a cluster group associated with targeting criteria specified by the ad request if the user is not associated with characteristics satisfying the targeting criteria specified by the ad request. The cluster group selector 145 is further described below in conjunction with FIGS. 6-9.

The ad selector 155 selects one or more advertisements from the ad store 150 for presentation to the user in response to a request to present an advertisement to the user or other identification of an opportunity to present advertisement content to the user. In one embodiment, the ad selector 155 identifies targeting groups and cluster groups associated with a user and retrieves ad requests having targeting criteria associated with the identified cluster groups and targeting groups. Alternatively or additionally, the ad selector 155 receives ad requests specifying targeting criteria associated with targeting groups or cluster groups that are associated with the user. Hence, the targeting criteria associated with targeting groups and cluster groups associated with the user filter ads that may be selected for presentation to the user. The ad selector 155 may retrieve additional user characteristics from the user profile store 305, the content store 310, the action log 320, and the edge store 325 and account for the additional user characteristics when evaluating ad requests. Based on characteristics of the user ("user characteristics") the ad selector 155 determines a user's likelihood of interacting with the content of various ad requests. In one embodiment, the ad selector 155 uses an auction process to rank ad requests according to expected values to the online system 100 for presenting content from various ad requests, with an expected value of an ad request based on a bid amount associated with the ad request and a determined likelihood of the user interacting with content in the ad request. Based on the ranking from the auction process, the ad selector 155 selects one or more ad requests and communicates content of selected ad requests to a client device 107 or to a third-party system 230 for presentation to the user. In various embodiments, the web server 350 communicates content from the selected one or more ad requests to a client device 107 or a third-party system 230 for presentation.

The web server 360 links the online system 100 via the network 220 to the one or more client devices 107, as well as to the one or more third party systems 230. The web server 240 serves web pages, as well as other web-related content, such as JAVA®, FLASH®, XML and so forth. The web server 360 may receive and route messages between the online system 100 and the client device 107, for example, instant messages, queued messages (e.g., email), text messages, short message service (SMS) messages, or messages sent using any other suitable messaging technique. A user may send a request to the web server 360 to upload information (e.g., images or videos) that are stored in the content store 310. Additionally, the web server 360 may provide application programming interface (API) functionality to send data directly to native client device operating systems, such as IOS®, ANDROID™, WEBOS®, or BlackberryOS.

Expanding Targeting Criteria in Response to Advertisement Performance

Figure 4:
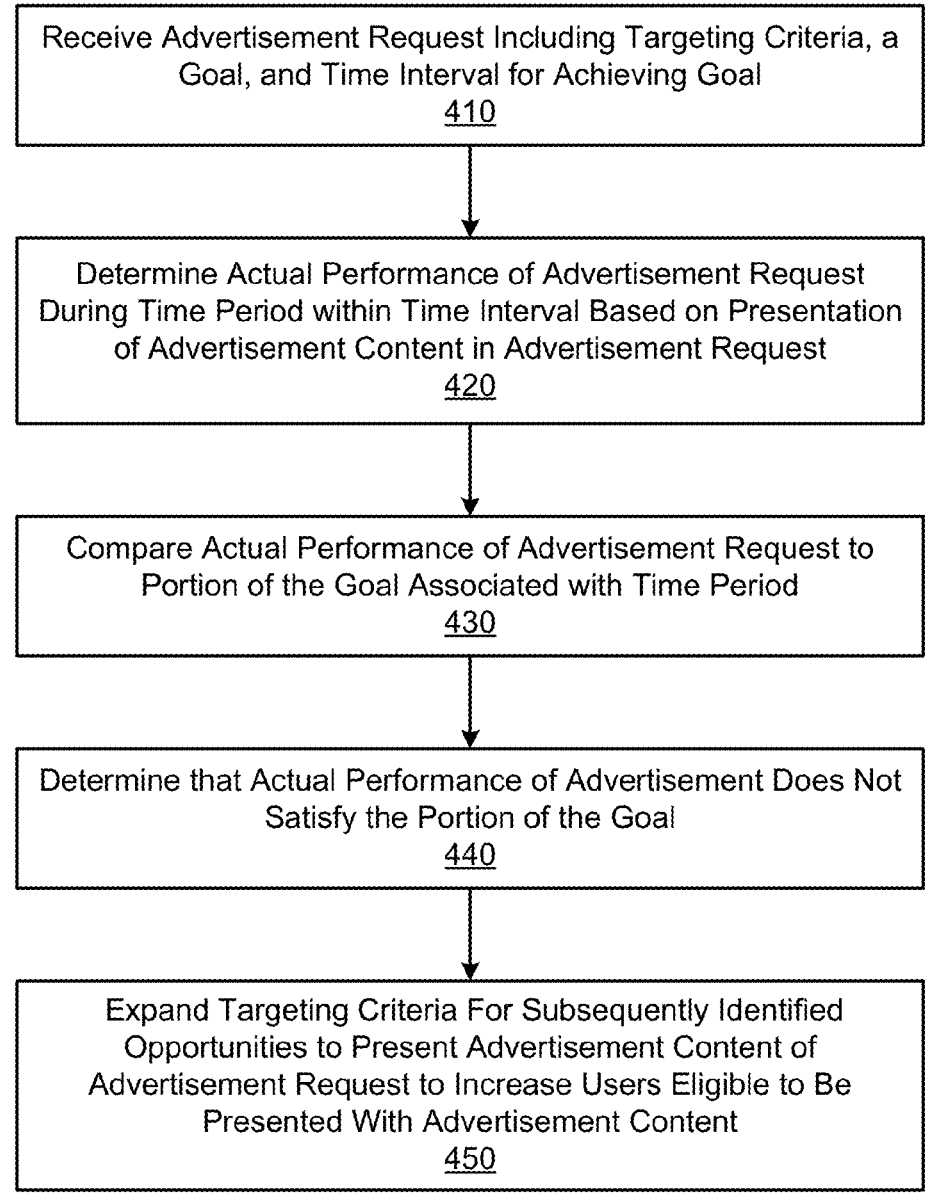
FIG. 4 is a flowchart of a process for increasing a target audience of an advertisement in response to performance of the advertisement, in accordance with an embodiment.

FIG. 4 is a flowchart of a process for increasing a number of users in a target audience of an advertisement request in response to performance of the advertisement, in accordance with an embodiment. The online system 100 (such as a social networking system) receives 410 an advertisement request that includes advertisement content, targeting criteria, a goal, and a time interval for achieving the goal. As described above in conjunction with FIG. 2, the advertisement content is any content capable of being displayed via online system 100 and may include text, an image, a video, an animation, an application, interactive media, a hyperlink, another pointer or reference to content, or a combination thereof. The targeting criteria specify user characteristics of users in a target audience for the advertisement request, where the target audience includes users eligible to be presented with advertisement content in the advertisement request. For example, users having at least a threshold number of user characteristics matching user characteristics specified by targeting criteria are included in the target audience for the advertisement request. Because the target audience includes users eligible to be presented with the advertisement content, the target audience may include users associated with a targeting group associated with the advertisement request and users associated with a cluster group associated with the advertisement request.

The goal specified by the advertisement request is a measurable indicator or metric of an objective of the advertisement request. The goal of the advertisement request may be a budget for the advertisement request. For example, an advertiser associated with the advertisement request specifies a budget for the advertisement request, and the online system 100 charges the advertiser for conversion events associated with the advertisement content (e.g., interactions with the advertisement content by users presented with the advertisement content, presentations of the advertisement content to users). A conversion event may be any suitable interaction with advertisement content by a user or indication the user has been presented with the advertisement content. Example conversion events include an impression (presentation of advertisement content to the user), an interaction with the advertisement content (accessing the advertisement content), or completion of an action associated with the advertisement content (e.g., a user purchases a product, registers with a service, creates an account, or downloads software). In one embodiment, different interactions with the advertisement content may be associated with different amounts charged to an advertiser, and the advertiser is charged a total amount associated with various interactions with the advertisement content that does not exceed the budget of the advertisement request. Alternatively, the goal specified by the advertisement request may be a number of interactions (e.g., impressions) for the advertisement content, a number of conversions, a composite value reflecting different numbers of different types of conversion events (e.g., a weighted sum of interaction counts with weights corresponding to relative importance of different interactions to an advertiser), a number of distinct users presented with advertisement content, or any other suitable value. The advertisement request also includes a time interval for completing the goal. For example, the time interval of the goal is a deadline after which the online system 100 cancels the advertisement request, or the time interval may be a requested time interval that does not cause cancellation of the advertisement request after expiration of the time interval. Hence, the goal and the time interval of the advertisement request describe an advertiser's expected or desired performance of the advertisement request.

While the online system 100 presents advertisement content from the received advertisement request to users during the time interval specified by the advertisement request, the online system 100 determines 420 an actual performance of the advertisement. For example, the online system 100 retrieves information from the action log 320 describing interactions with advertisement content from the received advertisement request by various users of the online system 100. The online system 100 may infer certain interactions with advertisement content, such as impressions of advertisement content, based on information in the action log 320 identifying advertisement content presented on a display device of a client device 107. In some embodiments, the online system 100 receives information from one or more third party systems 230 describing interactions with a third party system 230 (e.g., purchases) by users after the users were presented with advertisement content from the received advertisement request. Based on user interactions with the advertisement content, the online system determines 420 the actual performance of the advertisement request during a time period within the time interval. The actual performance describes user interactions associated with the goal of the advertisement request during the time period. For example, the actual performance is determined 420 based on counts of interactions or impressions, or the actual performance is based on a rate of interactions or impressions within a time period contained in the time interval. Additionally, the actual performance may be determined 420 as an amount spent by the advertiser for presentation of the advertisement request during the period of the time interval. The time period within the time interval is generally a retrospective time period based on a portion of the time interval that has elapsed (e.g., a last week, the last day, a last quarter of the time interval, a time elapsed since the beginning of the time interval). For example, the actual performance is the average rate of interactions with the advertisement content during the time period or an average rate of spending of a budget associated with the advertisement request. Thus, the online system 100 determines 420 the actual performance of the received advertisement request based on interactions with content from the advertisement request that occurred during a completed portion of the time interval specified by the advertisement request.

The online system 100 compares 430 the determined actual performance of the advertisement request to a portion of the goal associated with the time period over which the actual performance was measured. For example, the portion of the goal is an expected number of interactions with advertisement content in the advertisement request or an expected amount spent for presentation of the advertisement content during the time period that is based on the specified goal. In one embodiment, the online system 100 determines whether the actual performance of the advertisement request is below the portion of the goal by more than a threshold amount, and determines that the actual performance of the advertisement does not satisfy the portion of the goal if the actual performance is more than the threshold amount below the portion of the goal. The online system 100 may interpolate the portion of the goal from a function predicting expected spending, expected interactions, or expected impressions; for example, the function is a linear function predicting spending, interactions, or impressions during the time interval. Alternatively or additionally, the function accounts for temporal usage patterns of users in the target audience associated the advertisement request (e.g., increased usage in the evening, decreased usage at night) when predicting expected spending, interactions, or impressions. In some embodiments, the threshold below the portion of the goal associated with the time period is determined by subtracting a constant value from the portion of the goal or by subtracting a percentage of the portion of the goal from the portion of the goal.

The portion of the goal may be a rate of interactions, impressions, or spending to satisfy the goal within the time period or within time remaining in the time interval of the advertisement request. For example, the online system 100 determines a spending rate to exhaust the budget of the ad request at the end of the time interval using the amount of time remaining in the time interval. If the actual performance (e.g., a spending rate during the time period of the time interval) is less than the rate to satisfy the goal, the online system 100 determines that the advertisement request does not satisfy the portion of the goal.

Based on the comparison of the actual performance of the advertisement request to the portion of the goal associated with the time period, the online system 100 determines 440 whether the actual performance of advertisement request is sufficient to satisfy the goal of the advertisement request during the time interval specified in the advertisement request. If the online system 100 determines 440 that the actual performance of the advertisement request does not satisfy the portion of the goal, the online system expands 450 one or more of the targeting criteria included in the advertisement request. By expanding the targeting criteria, the online system 100 increases a number of users eligible to be presented with advertisement content from the advertisement request for subsequently identified opportunities to present an advertisement to users. Any suitable method may be used to expand 450 the targeting criteria to increase a number of users identified as eligible to be presented with content from the advertisement request. In one embodiment, the online system expands 450 the targeting criteria by reducing a threshold number or percentage of user characteristics satisfying the targeting criteria to identify a user as eligible to be presented with advertisement content from the advertisement request. For example, the online system 100 decreases the number of user characteristics of a user to satisfy targeting criteria. In one example implementation, if the targeting criteria of an advertisement request specify geographic regions, age, gender, and one or more interests of the target audience, the online system 100 expands 450 the targeting criteria by including users with different interests than those specified by the targeting criteria but having a geographic region, an age, and a gender satisfying the targeting criteria. Hence, the online system 100 may modify deterministic rules identifying users satisfying targeting criteria of the advertisement request to expand 450 the targeting criteria.

In one embodiment, the online system expands 450 targeting criteria of the advertisement request by accounting for a measure of affinity between a user and the advertisement request. The online system 100 identifies a user associated with a subsequently identified opportunity to present advertisement content. If user characteristics of the identified user do not satisfy the targeting criteria included in the advertisement request, the online system 100 determines a measure of affinity (e.g., an affinity score) of the user for advertisement content included in the advertisement request based at least in part on user characteristics associated with the user. For example, the online system 100 calculates a higher affinity score between an advertisement request for a coffee shop and a user that is connected to objects in the online system 100 related to coffee than between the advertisement request for the coffee shop and another user with on connections to objects in the online system 100 not associated with coffee. Based at least in part on the determined measure of affinity, the online system 100 determines whether the user is eligible to be presented with advertisement content from the advertisement request. For example, the user is eligible to be presented with content from the advertisement request if the measure of affinity between the user and the advertisement content equals or exceeds a cutoff value. Additionally or alternatively, the online system 100 selects a proportion of users ranked by measure of affinity for the advertisement content as eligible to be presented with advertisement content from the advertisement request. For example, the online system 100 includes the user in a cluster group associated with the targeting criteria and the advertisement request if the user's measure of affinity for content in the advertisement request is greater than the cluster cutoff score of the cluster group.

The online system 100 may limit a number of users included in the target audience of users eligible to be presented with advertisement content from an advertisement request subject to a maximum ratio of users. An example ratio for limiting the number of users included in the target audience is an expansion ratio of a number of users included the expanded target audience associated with the expanded targeting criteria to a number of users included in the target audience associated with the targeting criteria originally specified in the advertisement request. This expansion ratio is a number of users in at least one of the targeting group associated with an advertisement request and the cluster group associated with the advertisement request divided by a number of users associated with the targeting group associated with the advertisement request. Another ratio for limiting the number of users included in the target audience is an inclusion ratio, which is a ratio of a number of users included in the expanded target audience relative to a number of users in a target population of a set of users meeting deterministic criteria such as country of origin, demographic criteria, or any other user characteristics. The target audience includes users from the target population satisfying the deterministic criteria defining the target population and targeting criteria included in the advertisement request. In expanding the target audience, the online system 100 does not relax or otherwise expand the deterministic criteria defining the target population. Subject to the maximum ratio (e.g., the expansion ratio, the inclusion ratio), the online system 100 expands 450 the targeting criteria to increase the number of users included in the target audience subject to an upper limit on the number users in the target audience specified by the maximum ratio.

Figure 5:
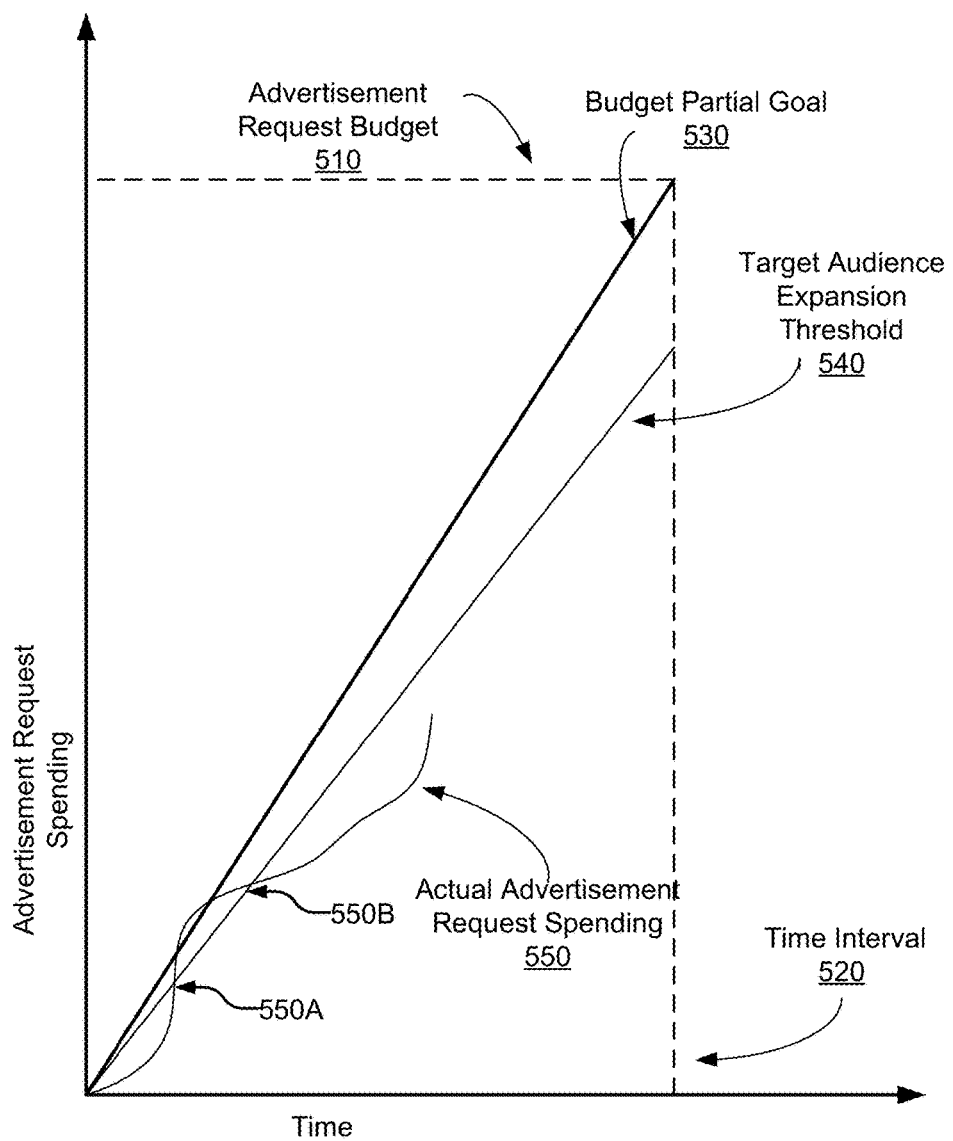
FIG. 5 is a conceptual diagram illustrating performance of an advertisement request, in accordance with an embodiment.

FIG. 5 is a conceptual diagram illustrating an example performance of an advertisement request. In FIG. 5, a graph depicts spending associated with an advertisement request over time. The advertisement request in the example of FIG. 5 has an advertisement request budget 510 specified as a goal and a time interval 520 indicating a length of time to achieve the goal (in this case, spending the advertisement request budget 510). Based on the time interval and the goal, the online system 100 determines a budget partial goal 530 for different time periods within the time interval 520. The partial budget goal 530 indicates an amount spent during a time period within the time interval 520 so that the total amount spent during the time interval 520 exhausts the advertisement request budget 510 when the time interval 520 is completed. In the example of FIG. 5, the online system 100 assumes that the advertisement request exhausts its budget at a linear rate during the time interval 520. The online system 100 determines a target audience expansion threshold 540 as a percentage of the budget partial goal 530. If the actual advertisement request spending 550 (a measure of actual performance in this case) is less than the target audience expansion threshold 540, the online system 100 expands targeting criteria included in the advertisement request to increase the number of users in the target audience for the advertisement request.

In the example of FIG. 5, the advertisement request begins the time interval 520 with an actual advertisement request spending 550 lower than the budget partial goal 530, which represents an expected spending rate (seen as the slope of the curve representing actual advertisement request spending 550), so the online system 100 expands the targeting criteria so the advertisement request is eligible for presentation to a greater number of users. As the targeting criteria expand, the number of users presented with the advertisement content from the advertisement request increases, so the budget partial goal 530 (i.e., the spend rate of the advertisement request) increases over time. In FIG. 5, the actual advertisement request spending 550A exceeds the target audience expansion threshold 540, so the online system 100 reverts back to the targeting criteria of the advertisement request specified by the advertisement request, reducing the number of users eligible to be presented with content from the advertisement request. After reverting to the initial targeting criteria in the example of FIG. 5, the actual advertisement request spending 550B again falls below the target expansion threshold 540, causing the online system 100 to again expand the targeting criteria. Thus, the online system 100 expands the targeting criteria of the advertisement request to facilitate spending on the advertisement request to satisfy the advertisement request budget 510 during the time interval 520.

Figure 6:
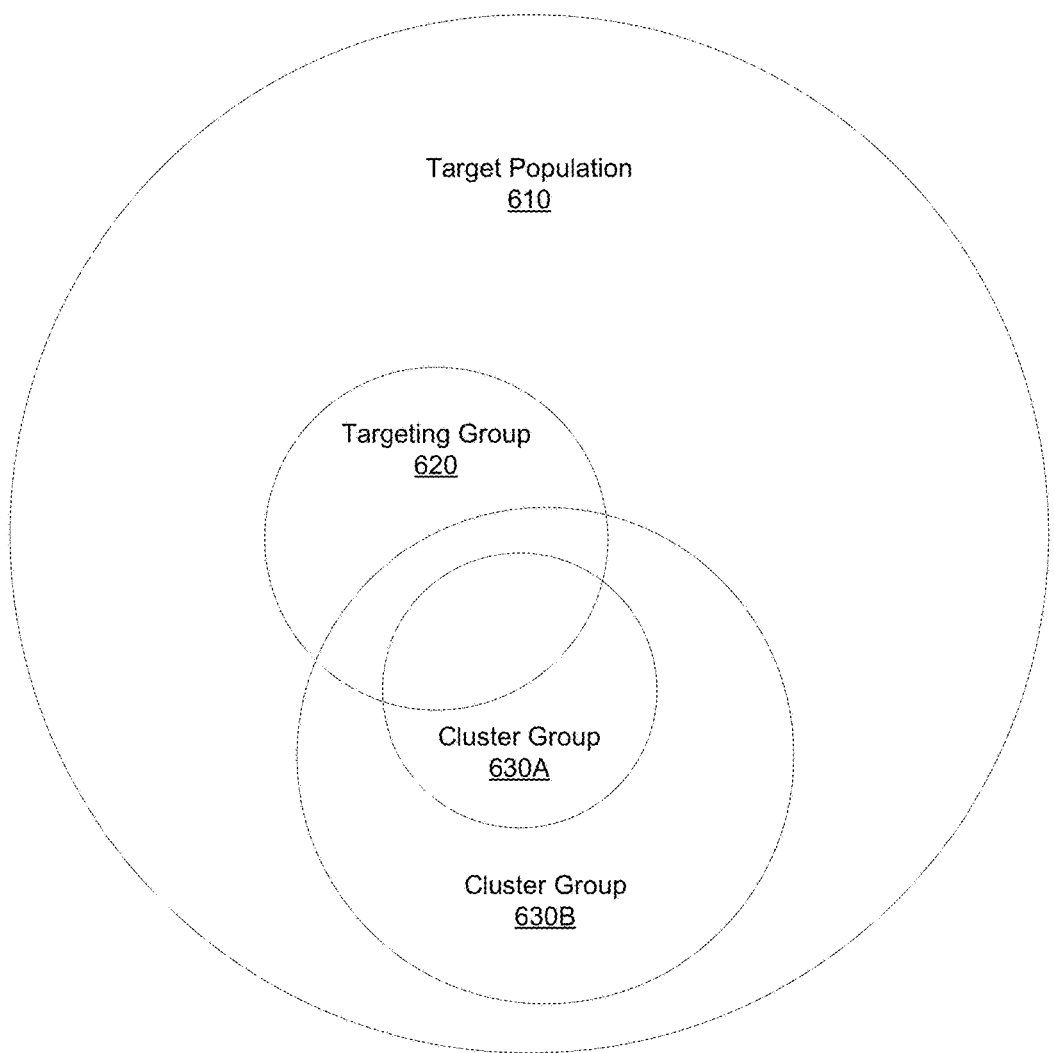
FIG. 6 is a conceptual diagram illustrating groups of users eligible to be presented with advertisement content, in accordance with an embodiment.

FIG. 6 is a conceptual diagram illustrating groups of users eligible to be presented with advertisement content, in accordance with an embodiment. In the example of FIG. 6, an advertisement request includes deterministic criteria that define a target population 610. For example, the target population includes users who live in Canada or female users who live in Montana. The target population 610 includes a targeting group 620 defined by targeting criteria associated with the advertisement request specifying characteristics of users eligible to be presented with content from the advertisement request. The targeting criteria include the deterministic criteria as well as one or more additional criteria. For example, the targeting criteria specify a targeting group 620 including users who live in Canada and are connected to a social networking object representing a film festival. As another example, the targeting criteria specify a targeting group 620 including female users who live in Montana and access the online system 100 more than a threshold number of times per week. Initially, the users in the targeting group 620 are the target audience eligible to be presented with advertisement content from the advertisement request.

If the online system 100 determines to expand the targeting criteria, the online system 100 identifies users associated with a cluster group 630 associated with the advertisement request. The target audience for the advertisement request then includes users in at least one of the targeting group 620 and the cluster group 630, increasing the number of users eligible to be presented with advertisement content. For example, the cluster group 630 includes users who do not satisfy one or more of the targeting criteria of the advertisement request but who have a measure of affinity to the advertisement content of the advertisement request equaling or exceeding a threshold affinity (a "cluster cutoff score").

By varying the threshold affinity or cluster cutoff score, the online system 100 modifies the number of users associated with the cluster group 630. For example, the online system 100 associates a higher cluster cutoff score or threshold measure of affinity with cluster group 630A than the cluster cutoff score or threshold measure of affinity associated with cluster group 630B. This causes fewer users to be associated with cluster group 630A than with cluster group 630B. In the example of FIG. 6, the online system 100 uses a maximum ratio to determine a number of users in the target audience. If the maximum ratio is an expansion ratio of the number of users in the expanded target audience to the number of users in the unexpanded target audience, the maximum ratio is equal to the number of users in the union of the targeting group 620 and the cluster group 630 divided by the number of users in the targeting group 620. If the maximum ratio is an inclusion ratio of the number of users in the expanded target audience relative to the target population 610, then the maximum ratio is equal to the number of users in the union of the targeting group 620 and the cluster group 630 divided by the number of users in the target population 610.

Targeting Criteria Expansion Using an Advertisement Performance Metric

Figure 7:
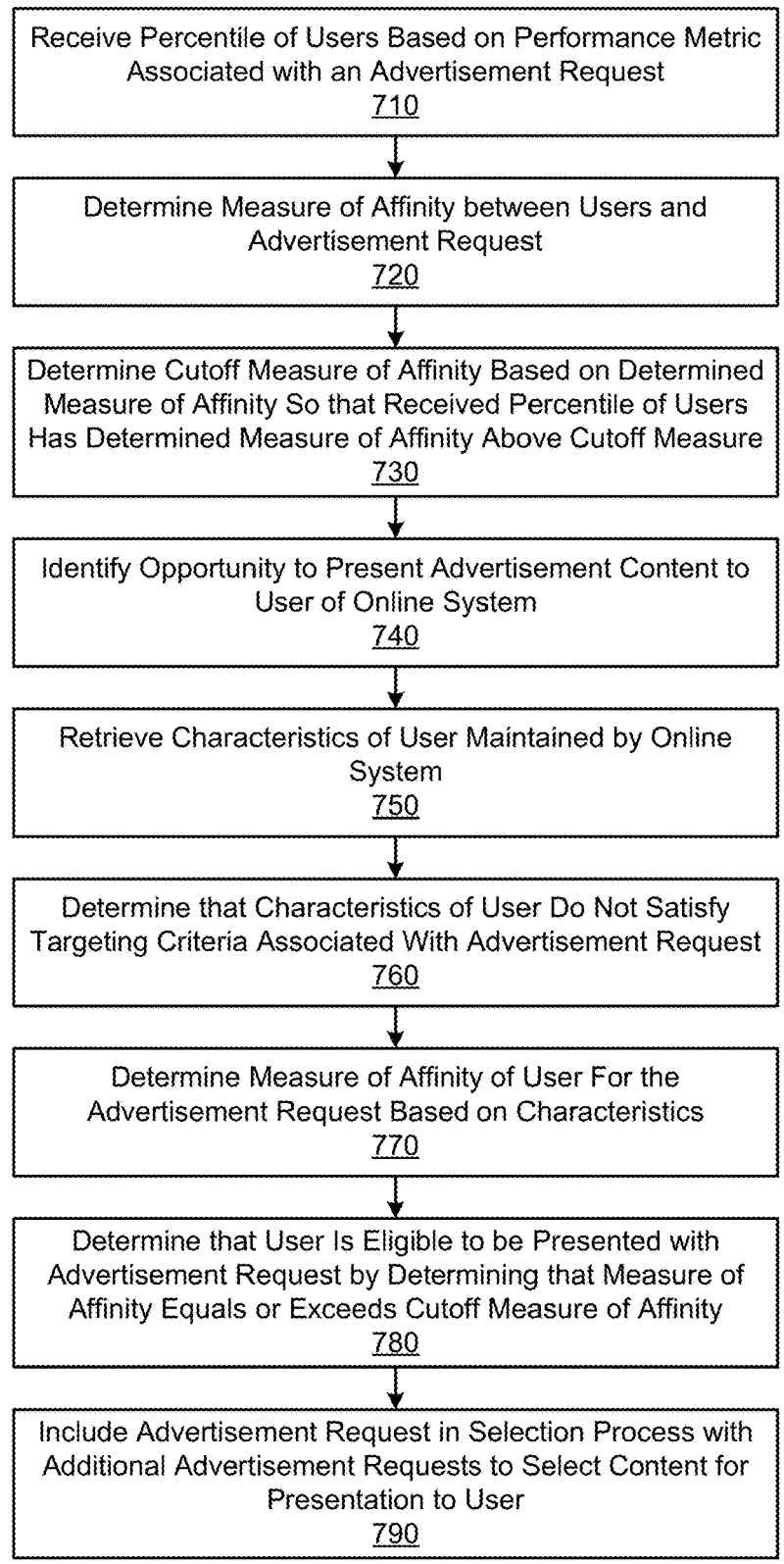
FIG. 7 is a flowchart of a process for determining whether a user is included in a target audience of an advertisement, in accordance with an embodiment.

FIG. 7 is a flowchart of one embodiment of a process for increasing users in a target audience of an advertisement request using a performance metric of the advertisement request. An online system 100 (such as a social networking system) determines to expand targeting criteria of an advertisement request to increase a number of users eligible to be presented with advertisement content of the advertisement request (i.e., a target audience of the advertisement request). When expanding the targeting criteria, the social networking system 100 accounts for a performance metric so the increased number of users in the target audience does not impair the performance metric, and may improve the performance metric. The performance metric of the advertisement request is a measurable indication of performance of the advertisement request. Example performance metrics include a number of conversions, a number of interactions, a number of impressions, a rate of conversions, a rate of interactions (e.g. a click-through rate), a cost per conversion, a cost per interaction (e.g., cost per click, cost per impression), or any other suitable measure of user interaction with the advertisement request. Including users who contribute to relatively higher performance metrics in the expanded target audience, the online system 100 more efficiently expands the target audience of the advertisement request.

To expand the target audience of the advertisement request, the online system 100 obtains 710 a percentile of users based at least in part on a performance metric, such as conversions, associated with the advertisement request. When the percentile is high (e.g., top-fifty percent of users), the targeting criteria are broadened and the target audience is larger than when the percentile is low (e.g., top-five percent of users). The percentile of a user refers to a ranking of the user relative to other users of the online system 100. The other users may be all the users of the online system 100 or a subset of the online system users (e.g., the target population, users in the same country as the user, users speaking the same primary language as the user). In one embodiment, the online system 100 receives the percentile of users from an advertiser associated with the advertising request. For example, the advertiser selects a maximum percentile of users via an advertiser interface provided by the online system 100 presenting data summarizing performance metrics for users in different percentiles of users.

Alternatively or additionally, the online system 100 determines the percentile of users based on information maintained or received by the online system 100. In one embodiment, the online system 100 obtains 710 the percentile of users by analyzing one or more performance metrics associated with the advertisement request. For example, the online system 100 retrieves historical data describing interactions with the advertisement content of the advertisement request by users of the online system 100. Based on these interactions, the online system 100 determines one or more performance metrics for the advertisement request. For example, the online system 100 determines conversions associated with the advertisement request from a number of users downloading an application included in the advertisement content of the advertisement request and normalizes the number of conversions by the number of impressions of the advertisement content to the user. The retrieved historical data may include interactions with additional advertisement requests. For example, the online system 100 determines performance metrics based on interactions with advertisement requests similar to the advertisement request (e.g., based at least in part on similarity between targeting criteria of advertisement requests or measures of affinity between users and advertisement content from various advertisement requests). The online system 100 may determine likelihoods of various users performing a conversion associated with an advertisement request based on performance metrics relating to other advertisement requests including advertisement content presented to various users.

Based on the retrieved historical data, the online system 100 determines the percentile based at least in part on an amount of interaction with content from the advertisement request by users of the online system 100. In one embodiment, the online system 100 ranks users by the determined performance metric (e.g., conversions, amount of interaction with advertisement content) and then performs a data fit between the percentile ranking and the performance metric. Alternatively or additionally, the online system 100 ranks the users by affinity between the users and the advertisement request and then performs a data fit between the percentile ranking and the measure of affinity. Based on the data fit, the online system 100 selects the percentile. In one embodiment, the online system 100 selects a percentile associated with a threshold affinity or performance metric (e.g., rate of interactions, conversions). Alternatively or additionally, the online system 100 determines a trade-off point where diminishing returns (to conversion or other advertisement metrics) outweigh benefits of an increased target audience size. For example, the online system 100 selects the percentile based on a derivative of the data fit (e.g., the percentile is selected as a percentile corresponding to a maximum in the second-order derivative of the data fit) or selects the percentile based on a curvature of the data fit (e.g., the percentile is selected as the percentile corresponding to a maximum in curvature of the data fit). As another example, the online system 100 determines a percentile where the first derivative of the data fit equals a slope of a line between the highest ranked user and the lowest ranked user in a plot of performance metric (or affinity) versus percentile ranking. Hence, the online system 100 may determine the percentile based at least in part on historical data describing interactions with one or more advertisement requests.

In addition to obtaining 710 a percentile of users, the online system determines 720 a measure of affinity between various users of the online system 100 (e.g., all users, a subset, a targeting group) and a received advertisement request. In one embodiment, the online system 100 determines the measure of affinity based on affinities (or affinity scores) between users and various objects associated with objects maintained by the online system 110 and associated with the advertisement request. For example, an advertisement request including an advertisement about snowmobiles is associated with objects in the online system 110 representing an advertiser (the snowmobile manufacturer), an affiliate (a snowmobile dealer), and a page for snowmobiles. The online system 100 determines higher measures of affinity for users having a higher measure of affinity (based on connections between the user and other objects as well as user interactions with other objects) for the objects maintained by the online system 100 and associated with the advertisement request. In the previous example, the online system 100 determines higher measures of affinity for users having a connection via the online system 100 to objects related to snowmobiles.

Based on the measures of affinity between the users and the advertisement request as well as the obtained percentile of users, the online system determines 730 a cutoff measure of affinity so that the obtained percentile of users includes users having a determined measure of affinity above the cutoff measure of affinity. In one embodiment, the online system 100 ranks the users by affinity and determines a distribution of users by affinity. The cutoff measure of affinity is determined 730 as the measure of affinity above which the number of users equals the obtained percentile of users. Thus, the cutoff measure of affinity determines which users are included in an expanded target audience for an advertisement request.

After determining the cutoff measure of affinity for the advertising request, the online system 100 identifies 740 an opportunity to present advertisement content to a user of the online system. For example, the online system identifies 740 the opportunity after receiving a request to present an advertisement from a client device 107. As another example, the opportunity is identified 740 when a user accesses content provided by the online system 100 through a third-party system 230 or when the user accesses the third-party system 230 using information associated with the user and maintained by the online system 100.

In response to identifying 740 the opportunity to present advertisement content to a user, the online system retrieves 750 user characteristics of the user (e.g., from the user profile store 305, the action log 320, or the edge store 325). Example characteristics of the user include demographic information, age, geographic location, relationship status, country, or languages spoken. Other example characteristics include a number of one or more types of actions performed by the user, a frequency with which the user performs one or more types of actions, or a number of one or more types of actions performed within a time interval (e.g., number of logins, frequency of posts, number of tagged photos within the last year, number of location check-ins during a time interval). Other example characteristics include explicit or implicit connections between the user and other users or objects via the online system 100, a number of connections between the user and other users or objects (e.g., a number of connections between the user and a specific type of object), or a connection to a type of object in the online system 100.

Based on the user characteristics, the online system 100 determines 760 whether the characteristics of the user satisfy targeting criteria associated with the advertisement request. For example, the online system 100 determines whether the characteristics of the user satisfy at least a threshold number or percentage of characteristics specified by the targeting criteria. If the characteristics of the user do not satisfy at least the threshold number or percentage of targeting criteria associated with the advertisement request, the online system 100 determines 770 a measure of affinity for the user for the advertisement content included in the advertisement request based on the characteristics of the user. The determined measure of affinity provides a measure of expected user interest in the advertisement content or expected likelihood of the user interacting with the advertisement content.

The online system 100 determines 780 whether the determined measure of affinity equals or exceeds the determined cutoff measure of affinity. If the determined measure of affinity equals or exceeds the cutoff measure of affinity, the user is eligible to be presented with advertisement content from the advertisement request, so the online system 100 includes 790 the advertisement request in a selection process with additional advertisement requests to select content for presentation to the user. The additional advertisement requests may be identified using the above-described process for various advertisement requests or through any other suitable method. The online system 100 may also identify additional advertisement requests eligible for presentation to the user having targeting criteria satisfied by characteristics of the user.

From the advertisement requests including content eligible for presentation to the user, the online system 100 selects one or more advertisements for presentation to the user. For example, the selection process is an auction that selects one or more advertisement requests based on bid amounts associated with various advertisement requests. Additional information, such as the user's likelihoods of interacting with content included in various ad requests may be used along with the ad requests' bid amounts to rank the ad requests, with one or more ad requests selected based on the ranking Content from one or more of the selected ad requests is communicated to the user. For example, the online system 100 transmits advertisement content of an advertisement request selected by the selection process to a client device 107.

Figure 8:
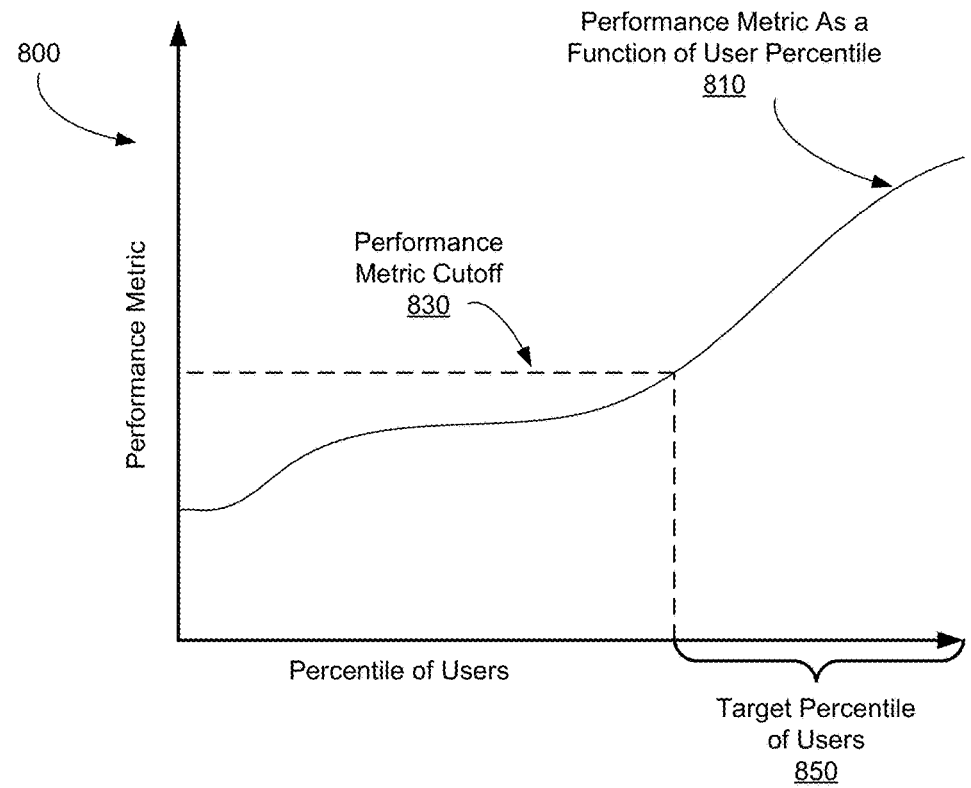
FIG. 8 is a conceptual diagram illustrating a relationship between a performance metric and a cutoff measure of affinity, in accordance with an embodiment.
Figure 8:
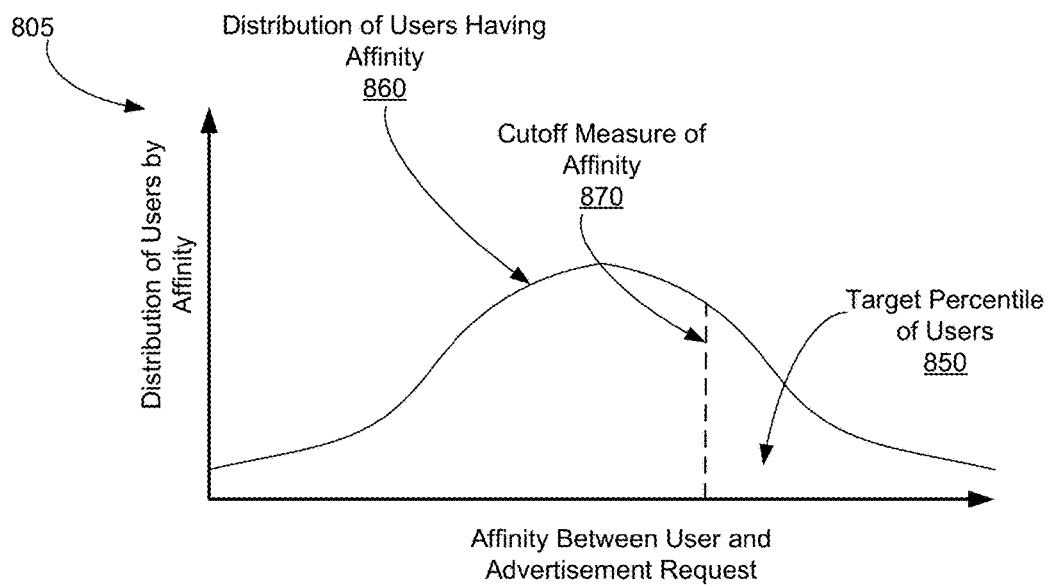

FIG. 8 is a conceptual diagram illustrating an example of the relationship between a performance metric and a cutoff measure of affinity. Graph 800 in FIG. 8 plots a performance metric 810 as a function of percentile of users. The online system 100 retrieves historical data and determines performance metrics 810 for an advertisement request based on prior user interactions with the advertisement request, or with similar advertisement requests. The online system 100 ranks the users by the performance metric 810 associated with each user and assigns a percentile to the ranked users based on the ranking. The online system 100 then determines a target percentile of users 850 from the ranking of users based on performance metric 810. For example, the online system 100 determines the target percentile of users 850 as users associated with a performance metric 810 higher than a performance metric cutoff 830. As another example, the online system 100 uses a first-order derivative, a second-order derivative, or a curvature of a data fit of the performance metric to optimize a tradeoff between including more users in the target audience and decreasing the performance metric 810.

Graph 805 in FIG. 8 illustrates a distribution of users of the online system 100 by measures of affinity associated with various users. In FIG. 8, the vertical height of the distribution 860 indicates a number of users having a measure of affinity corresponding to a position along the horizontal axis. The example distribution 860 of FIG. 8 indicates the number of users having relatively high measures of affinity and relatively low measures of affinity is small, and that there are relatively more users having measures of affinity relatively close to an average measure of affinity. The area under the distribution 860 between two measures of affinity corresponds to a number of users having a measure of affinity between the two measures of affinity. This number of users is proportional to the percentile of users, so the area under the distribution 860 between a cutoff measure of affinity 870 and the user with a highest measure of affinity corresponds to the target percentile of users 850. The online system 100 determines the cutoff measure of affinity 870 so that users in the target percentile of users 850 have affinities greater than the cutoff measure of affinity 870.

Advertisement Selection for a User in a Cluster Group

Figure 9:
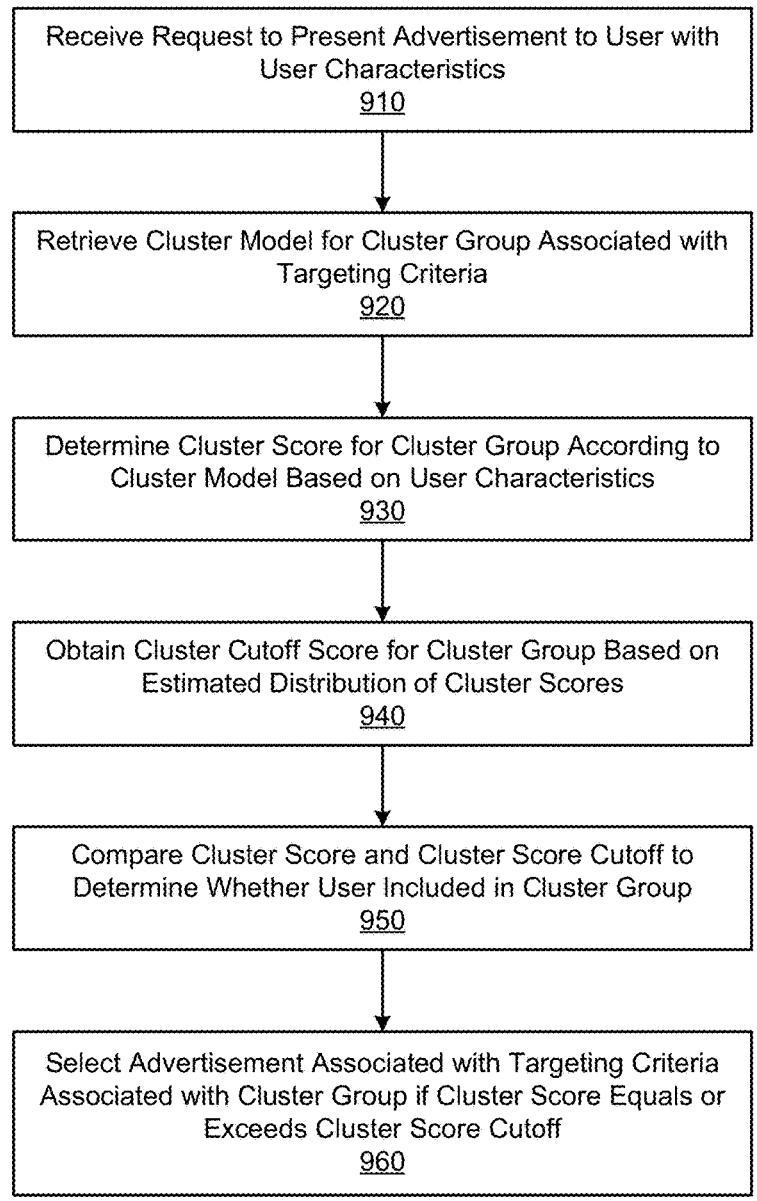
FIG. 9 is a flowchart of a process for selecting an advertisement for presentation to a user using one or more cluster groups associated with the user, in accordance with an embodiment.

FIG. 9 is a flowchart of one embodiment of a process for selecting an advertisement for presentation to a user using a cluster group. The online system 100 receives 910 a request to present an advertisement to a user or otherwise identifies an opportunity to present an advertisement to the user. For example, the request is received 910 from a client device 107 through the web server 360. As another example, the request is received 910 from a third-party system 230 via the web server 360. For example, the request is received 910 when a user accesses content provided by the online system 100 or when the user accesses the third-party system 230 using information associated with the user and maintained by the online system 100.

In response to receiving 910 the request, the online system 100 retrieves user characteristics of the user from one or more of the user profile store 305, the action log 320, and the edge store 325. Example characteristics of the user include demographic information, age, geographic location, relationship status, country, languages spoken. Other example characteristics include a number of one or more types of actions performed by the user, a frequency with which the user performs one or more types of actions, or a number of one or more types of actions performed within a time interval (e.g., number of logins, frequency of posts, number of tagged photos within the last year, number of location check-ins during the month before Christmas). Other example characteristics include explicit or implicit connections between the user and other users or objects via the online system 100, a number of connections between the user and other users or objects (e.g., a number of connections between the user and a specific type of object), or a connection to a type of object.

Based on the retrieved user characteristics, the online system 100 determines whether the user characteristics satisfy targeting criteria associated with an advertisement request. If the online system 100 determines that the user characteristics do not satisfy targeting criteria associated with the advertisement request, the online system 100 determines whether the user is associated with a cluster group that is associated with the targeting criteria associated with the advertisement request. Alternatively or additionally, the online system 100 determines whether the user is associated with a cluster group that is associated with the targeting criteria associated with the advertisement request. In one embodiment, the online system 100 determines one or more cluster groups associated with the user and determines if the user is associated with a cluster group associated with the targeting criteria associated with the advertisement request. As described above in conjunction with FIGS. 1 and 3, a cluster group is associated with one or more targeting criteria. By identifying one or more cluster groups associated with a user, the online system 100 identifies targeting criteria to associate with the user even though characteristics of the user do not satisfy the targeting criteria. This allows the online system 100 to identify additional advertisements or other content for presentation to the user, even though the user is not associated with at least a threshold number of characteristics that satisfy the targeting criteria.

The online system 100 selects a cluster group, such as a cluster group associated with targeting criteria specified by a retrieved advertisement request, and retrieves 920 a cluster model associated with the cluster group. The cluster model may include a set of cluster model parameters. Based on the cluster model and the characteristics of the user, the online system 100 determines 930 a cluster score of the user for the cluster group. The cluster score provides a measure of the user's affinity for an advertisement or other content associated with the targeting criteria associated with the cluster group.

Various cluster techniques may be used to determine the cluster model associated with a cluster group. In various embodiments, the cluster model implements machine learning and/or statistical techniques. For example, the cluster model is a statistical classifier using a weighted linear combination of values corresponding to user characteristics (or a logistic function of the weighted linear combination), with the cluster model parameters used as weights of the linear combination. As another example, the cluster model is an unsupervised machine learning algorithm, such as an artificial neural network, and the cluster model parameters are weights of connections between input, hidden, and output layers of the neural network. Cluster model parameters of the cluster model may be pre-computed and stored in the model parameters store 145 to more efficiently associate the user with one or more cluster groups. The cluster model parameters may be recomputed periodically, or they may be updated (e.g., by a weighted average) based on additional data. Updating cluster model parameters associated with a cluster group when requests for advertisements are received 910 allows cluster model parameters to better reflect characteristics of users that actively interact with the online system 100, which may reduce the accuracy of cluster scores generated for infrequent users of the online system 100 while increasing the accuracy of cluster scores determined for users that frequently interact with the online system 100. Alternatively, the cluster model parameters may be computed in real time.

In one embodiment, the online system 100 determines cluster model parameters based on training data. The online system 100 generates training data for a cluster group based on characteristics of users associated with a targeting group that is associated with the same targeting criteria as the cluster group. In one embodiment, the training data for a cluster group is generated by randomly sampling users in a targeting group associated with targeting criteria that is also associated with the cluster group. Alternatively or additionally, the training data may include characteristics of randomly selected online system users. From the characteristics of the users in the targeting group or from the randomly selected online system users, the online system 100 identifies various user characteristics or combinations of user characteristics. An example combination of user characteristics is a binary value indicating whether a user is a West Coast resident and an indication of whether the user has a check-in at a sushi restaurant. Examples of user characteristics include a number of posts made by the user about sushi or a binary value indicating whether the user is connected to an object representing fish and chips.

The online system 100 determines affinities for content associated with targeting criteria associated with the cluster group for different user characteristics and combinations of user characteristics determined from the training data. The determined affinities provide a measure of a user having different user characteristics or combinations of user characteristics in content associated with targeting criteria associated with the cluster group. Hence, the determined affinities provide an indication of a likelihood of a user having a combination of characteristics or having a characteristic such as interacting with content associated with the targeting criteria.

Based on targeting probabilities for different user characteristics and combinations of user characteristics, the online system 100 determines cluster model parameters. Cluster model parameters may be determined using various methods depending on a type of cluster model used. For example, if the cluster model is a linear regression, a multinomial regression is performed on the values of the user characteristics and the combinations of user characteristics as well as targeting probabilities associated with user characteristics and combinations of user characteristics. If the cluster model is a logistic function, a multinomial logistic regression is performed on values of the user characteristics, the combinations of user characteristics, and the targeting probabilities. If an artificial neural network cluster model is used, the cluster model parameters are determined using an iterative process to minimize a cost function over the training data.

The online system 100 determines 930 a cluster score for the cluster group based on the retrieved cluster model parameters and a cluster model (e.g., a logistic function, an artificial neural network). The cluster score provides an affinity of the user for content associated with the targeting criteria that are associated with the cluster group. For example, if a cluster group is associated with targeting criteria of a connection to an object having a topic of "sushi," a user having characteristics of check-ins at sushi restaurants, posts mentioning sushi, and a residence in a West Coast metropolis has a higher cluster score, based on characteristics of users associated with a targeting group associated with the same targeting criteria, than a user having characteristics of posts mentioning fish and chips and a residence in the rural Midwest.

In addition to determining a cluster score between the user and cluster group, a cluster cutoff score is obtained 940 for the cluster group. In one embodiment, the cluster cutoff score is obtained 940 from a third-party. For example, a received ad request includes a cluster cutoff score specified by an advertiser. In one embodiment, obtaining the cluster cutoff score includes determining the cluster cutoff score in real time in response to the request to present an advertisement. The cluster cutoff score may also be obtained 940 from a previously determined cluster cutoff score (e.g., in response to a previous request for an advertisement, in response to creation of the cluster group, as part of a periodic process to update the cluster cutoff score for a cluster group). In one embodiment, the cluster cutoff score is based on an estimated distribution of cluster scores and a target number or percentage of users. A specific cluster score in the distribution of cluster scores is associated with a number or percentage of users with cluster scores greater than or equal to the specific score and a number or percentage of users with cluster scores less than the specific cluster score. The cluster cutoff score corresponds to a cluster score where at least a target number or percentage of users have cluster scores less than the cluster cutoff score. For example, the target percentage of users is ninety percent, so the cluster cutoff score is determined as the cluster score with which ninety percent of users have cluster scores less than the cluster cutoff score. The target number or percentage may be specified or modified by an advertiser in an ad request or may be determined or modified by the social network 100. In some embodiments, the online system 100 modifies the cluster cutoff score for a cluster group based on one or more ad requests for the cluster group. For example, the online system 100 decreases the target number or percentage of users when determining the cluster cutoff score for a cluster group to increase the number of users eligible to be presented with content of an ad request including targeting criteria associated with the cluster group.

In one embodiment, the online system 100 determines a cluster cutoff score for a cluster group based on an estimated distribution of cluster scores. The online system 100 selects a set of users, such as a random set of users, and determines sampling scores for users in the selected set based on characteristics of various users in the set, cluster parameters associated with the cluster group, and the cluster model. The sampling scores are sorted to determine rankings of the sampling scores. For example, if one hundred sampling scores are determined for one hundred users, than the ninetieth score among the scores sorted low to high corresponds to a sampling score marking the ninetieth percentile of scores. In other embodiments, the cluster cutoff score is determined as described above in conjunction with FIGS. 7 and 8.

From the sorted sampling scores, the online system 100 may optionally select of a subset of sampling scores. When selecting the subset, the online system 100 selects an increased number of sampling scores having rankings within a threshold amount of the target number or percentage than having rankings greater than the threshold amount from the target number or percentage. The target number or percentage for the cluster cutoff score may be a relatively large percentage or number (e.g., the ninety-fifth percentile), so a relatively higher number of sampling scores are selected from above the target number or percentage of users (cluster cutoff score) than below the target number or percentage of users (cluster cutoff score). By selecting a subset of sampling scores having rankings within a threshold amount of the target number or percentage of users, the online system 100 more accurately discerns between users having cluster scores having less than a threshold difference from the cluster cutoff score. While this biased sampling may reduce the accuracy of the score distribution estimate for users with cluster scores greater than a threshold amount from the cluster cutoff score, these users have a low likelihood for being inaccurately associated with or not associated with the cluster group.

Based on the selected subset of sampling scores, the online system 100 performs a data fit between the sampling scores and the determined rankings of the sampling scores. For example, the data fit is performed using a regression technique to fit the sampling scores and determined rankings to a function, or the data fit is performed to approximate the data as a piecewise function. In various embodiments, the complete distribution does not need to be determined for the online system 100 to determine the cluster cutoff score. The online system 100 may use a distributed estimator to determine the cluster cutoff score or the distribution of cluster scores. In a distributed estimator, multiple computational nodes (e.g., processors) are arranged in a network and sample users to determine sampling scores and rankings. The computational nodes communicate results with neighboring computational nodes until a consensus is reached (e.g., a majority of computational nodes agree on a cluster cutoff score within a tolerance); any suitable distributed estimation algorithm (e.g., the consensus algorithm) may be used. The online system 100 may incrementally update a data fit of a known cluster score distribution for a cluster group based on previously determined cluster scores for users in response to requests to present ads to those users.

The determined cluster cutoff score for the cluster group is compared to the determined cluster score between the user and the cluster group to determine if the user is associated with the cluster group. In one embodiment, the user is associated with the cluster group if the cluster score for the user equals or exceeds the cluster cutoff score. If a user is associated with the cluster group, the user has at least a threshold affinity for content associated with targeting criteria associated with the cluster group, indicating that the user has a relatively higher likelihood of interacting with content associated with the targeting criteria associated with the cluster group; hence, the association with the cluster group identifies the user as eligible to receive advertisements associated with targeting criteria associated with the cluster group. In various embodiments, the online system 100, retrieves 920 cluster model parameters for multiple cluster groups, determines 930 cluster scores for the user and each of the multiple cluster groups, obtains 940 a cluster cutoff score for each of the multiple cluster groups, and compares 950 cluster scores for each cluster group with a cluster cutoff score for each cluster group to identify one or more cluster groups associated with the user. Hence, the online system 100 may associate a user with multiple cluster groups each associated with different targeting criteria.

Based on one or more cluster groups associated with the user and targeting criteria associated with each of the cluster groups associated with the user, the online system 100 selects 960 one or more advertisements for presentation to the user. In one embodiment, the online system 100 retrieves ad requests from the ad store 150 specifying targeting criteria matching targeting criteria of at least one cluster group associated with the user. The online system 100 may also retrieve ad requests associated with targeting criteria matching the targeting criteria of one or more targeting groups associated with the user. The retrieved ad requests are provided to a selection process, such as an auction, to select one or more ad requests for presentation to the user. Based on bid amounts associated with the selected ad request, the online system 100 selects 960 one or more ad requests and presents content from the selected ad requests to the user; additional information, such as the user's likelihood of interacting with content included in various ad requests may be used along with the ad requests' bid amounts to rank the ad requests, with one or more ad requests selected based on the ranking Content from one or more of the selected ad requests are communicated from the online system 100 to a client device 107 or a third-party system 230 for presentation to the user.

In various embodiments, cluster groups and targeting groups associated with a user may be determined differently than described above. For example, a cluster group is associated with users that are not associated with characteristics matching at least a threshold number of targeting criteria but that have at least a threshold likelihood of interacting with content associated with the targeting criteria. Alternatively, users having characteristics with a threshold similarity to characteristics of users in a targeting group are associated with a cluster group so the cluster group also includes users associated with the targeting group.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
receiving an advertisement request including targeting criteria specifying a target audience of users of an online system eligible to be presented with the advertisement request, the advertisement request specifying a goal and a time interval for achieving the goal;
determining an actual performance of the advertisement request during a time period within the time interval based on presentation of advertisement content included in the advertisement request to users of an online system;
comparing the actual performance of the advertisement request to a portion of the goal associated with the time period; and
responsive to the comparison determining that the actual performance of the advertisement request does not satisfy the portion of the goal associated with the time period:
identifying a cluster group that is associated with the targeting criteria included in the advertisement request;
selecting a sample set of users for determining a cluster cutoff score corresponding to a target ranking threshold based on the goal;
determining a set of sampling scores for the sample set of users;
determining a ranking of the sample set of users based on the respective sampling scores;
selecting a subset of the sample scores above a target ranking threshold and within a threshold amount of the target ranking threshold;
performing a data fit between the subset of the sample scores and the ranking to estimate a cluster cutoff score corresponding to the target ranking threshold, wherein performing the data fit to estimate the cluster cutoff score comprises:
performing the data fit on a plurality of computational nodes to generate a plurality of results;
sharing the results between neighboring computational nodes; and
selecting the cluster cutoff score in response to a consensus number of computational nodes agreeing on the cluster cutoff score;
identifying a target user outside of the target audience that has user characteristics failing to satisfy the targeting criteria;
determining, based on a cluster model, a cluster score for the user representing an affinity measure between characteristics and the targeting criteria for the cluster group;
comparing the cluster score to the cluster cutoff score to determine if the target user is a member of the cluster group; and
responsive to determining that the target user is a member of the cluster group, adding the target user to the target audience eligible to be presented with the advertisement request.

2. The method of claim 1, wherein comparing the actual performance of the advertisement request to the portion of the goal associated with the time period comprises:
determining whether the actual performance of the advertisement request is less than a threshold amount below the portion of the goal associated with the time period.

3. The method of claim 2, wherein the actual performance of the advertisement request does not satisfy the portion of the goal associated with the time period if the actual performance of the advertisement request is less than the threshold amount below the portion of the goal associated with the time period.

4. The method of claim 1, wherein the goal comprises a budget.

5. The method of claim 4, wherein determining the actual performance of the advertisement request during the time period within the time interval based on presentation of content included in the advertisement request to users of the online system comprises:
determining an average spending rate based on the time period within the time interval; and
determining a spending rate to satisfy the budget during the time interval based at least in part on the budget, the time interval, and an amount of time remaining in the time interval.

6. The method of claim 5, wherein comparing the actual performance of the advertisement request to the portion of the goal associated with the time period comprises:
determining the actual performance of the advertisement request does not satisfy the portion of the goal associated with the time period if the average spending rate is less than the spending rate by a threshold amount.

7. The method of claim 1, further comprising:
determining a maximum ratio of an expanded number of users included in the target audience eligible to be presented with advertisement content from the advertisement request to an unexpanded number of users included in the target audience eligible to be presented with advertisement content from the advertisement request; and wherein adding the target user to the target audience is subject to the determined maximum ratio.

8. The method of claim 1, wherein the goal comprises a number of impressions of the advertisement request.

9. A computer program product comprising a non-transitory computer readable storage medium having instructions encoded thereon that, when executed by a processor, cause the processor to:

receive an advertisement request including targeting criteria specifying a target audience of users of an online system eligible to be presented with the advertisement request, the advertisement request specifying a goal and a time interval for achieving the goal;

determine an actual performance of the advertisement request during a time period within the time interval based on presentation of advertisement content included in the advertisement request to users of an online system;

compare the actual performance of the advertisement request to a portion of the goal associated with the time period; and responsive to the comparison determining that the actual performance of the advertisement request does not satisfy the portion of the goal associated with the time period:

identify a cluster group that is associated with the targeting criteria included in the advertisement request;

select a sample set of users for determining a cluster cutoff score corresponding to a target ranking threshold based on the goal;

determine a set of sampling scores for the sample set of users;

determine a ranking of the sample set of users based on the respective sampling scores;

select a subset of the sample scores above a target ranking threshold and within a threshold amount of the target ranking threshold;

perform a data fit between the subset of the sample scores and the ranking to estimate a cluster cutoff score corresponding to the target ranking threshold, wherein performing the data fit to estimate the cluster cutoff score comprises:

performing the data fit on a plurality of computational nodes to generate a plurality of results;

sharing the results between neighboring computational nodes; and selecting the cluster cutoff score in response to a consensus number of computational nodes agreeing on the cluster cutoff score;

identify a target user outside of the target audience that has user characteristics failing to satisfy the targeting criteria;

determine, based on a cluster model, a cluster score for the user representing an affinity measure between characteristics and the targeting criteria for the cluster group;

compare the cluster score to the cluster cutoff score to determine if the target user is a member of the cluster group; and responsive to determining that the target user is a member of the cluster group, add the target user to the target audience eligible to be presented with the advertisement request.

10. The computer program product of claim 9, wherein comparing the actual performance of the advertisement request to the portion of the goal associated with the time period comprises:

determining whether the actual performance of the advertisement request is less than a threshold amount below the portion of the goal associated with the time period.

11. The computer program product of claim 10, wherein the actual performance of the advertisement request does not satisfy the portion of the goal associated with the time period if the actual performance of the advertisement request is less than the threshold amount below the portion of the goal associated with the time period.

12. The computer program product of claim 9, wherein the goal comprises a budget.

13. The computer program product of claim 12, wherein determining the actual performance of the advertisement request during the time period within the time interval based on presentation of content included in the advertisement request to users of the online system comprises:

determining an average spending rate based on the time period within the time interval; and determining a spending rate to satisfy the budget during the time interval based at least in part on the budget, the time interval, and an amount of time remaining in the time interval.

14. The computer program product of claim 13, wherein comparing the actual performance of the advertisement request to the portion of the goal associated with the time period comprises:

determining the actual performance of the advertisement request does not satisfy the portion of the goal associated with the time period if the average spending rate is less than the spending rate by a threshold amount.

15. The computer program product of claim 9, further comprising:

determining a maximum ratio of an expanded number of users included in the target audience eligible to be presented with advertisement content from the advertisement request to an unexpanded number of users included in the target audience eligible to be presented with advertisement content from the advertisement request; and wherein adding the target user to the target audience is subject to the determined maximum ratio.

16. The computer program product of claim 9, wherein the goal comprises a number of impressions of the advertisement request.

* * * * *